United States Patent [19]

Bestmann

[11] Patent Number: 5,481,380
[45] Date of Patent: Jan. 2, 1996

[54] METHOD AND APPARATUS FOR CALIBRATION OF COLOR VALUES

[75] Inventor: Günter Bestmann, Altenholz, Germany

[73] Assignee: Linotype-Hell AG, Eschborn, Germany

[21] Appl. No.: 261,884

[22] Filed: Jun. 17, 1994

Related U.S. Application Data

[63] Continuation of Ser. No. 43,271, Apr. 6, 1993, abandoned.

[30] Foreign Application Priority Data

Apr. 6, 1992 [DE] Germany ............ 42 11 453.5
Feb. 25, 1993 [DE] Germany ............ 43 05 693.8

[51] Int. Cl.$^6$ ..................... H04N 1/46
[52] U.S. Cl. ............ 358/504; 358/523; 358/518
[58] Field of Search .................. 358/504, 523, 358/524, 518, 527, 406, 500; 348/29, 30, 649, 650; 382/167

[56] References Cited

U.S. PATENT DOCUMENTS 5,267,030 11/1993 Giorgianni et al. ............ 358/518
5,309,256 5/1994 Takada et al. ............ 358/504
5,345,315 9/1994 Shalit ............ 358/504
5,416,613 5/1995 Rolleston et al. ............ 358/504

Primary Examiner—Edward L. Coles, Sr.
Assistant Examiner—Fan Lee
Attorney, Agent, or Firm—Hill, Steadman & Simpson

[57] ABSTRACT

The invention is directed to a method and to an apparatus for the calibration of color values in color conversion in apparatus and systems for image processing. Measured color values of an apparatus-dependent input color space are acquired by scanning a suitable test original with a plurality of color fields in an image input apparatus. The measured color values are transformed into color values of an apparatus-independent communication color space in an input color converter on the basis of an analytically approximately calculated conversion table. The approximate calculation of the conversion table occurs taking the pre-distortion of the measured color values and the spectral properties of the respective input apparatus into consideration. The transformed color values are compared to the colorimetrically defined color values of the test originals that are measured, for example, with a spectral photometer. Correction color values for the three-dimensional conversion table of the input color converter are calculated from the color value differences, the calculations being on the basis of an error compensating calculation.

25 Claims, 5 Drawing Sheets

METHOD AND APPARATUS FOR CALIBRATION OF COLOR VALUES

This is a continuation, of application Ser. No. 08/043,271, filed Apr. 6, 1993 now abandoned.

BACKGROUND OF THE INVENTION

The invention is directed to the field of electronic reproduction technology and relates to a method and to an apparatus for the calibration of color values in color conversion in apparatus and systems for image processing.

Reproduction technology is concerned with methods for reproducing image originals in printing, wherein a master is prepared from an original as the basis for a printing form. The reproduction of the original occurs in a printing press with the printing form.

The process for producing a master is generally composed of the steps of image input, image processing, and image output.

In the image input with, for example, a color image scanner, three primary color value signals (R, G, B) are acquired by trichromatic and pixel-by-pixel or line-by-line, optoelectronic scanning of the color originals to be reproduced, whereby the individual color value triads represent the color components "red" (R), "green" (G) and "blue" (B) of the pixels scanned in the color original. The analog color value signals are converted into digital color values and are stored for the subsequent image processing.

In the image processing, the color values (R, G, B) are usually first converted into color separation values (C, M, Y, K) with a basic color correction according to the rules of subtractive color mixing. These color separation values are a measure for the dosing of the inks "cyan" (C), "magenta" (M), "Yellow" (Y and "black" (K) or, respectively, for the sizes of the raster points or raster percentages employed in the later printing process. Over and above this, further color corrections are implemented in the image processing with the object of improving the image reproduction, of compensating deficiencies, or of undertaking editorial changes.

Following the image processing, the image output occurs with a unit suitable for this purpose, for example with a color separation recorder for the raster recording of the color separations on a recording material (film). The methods currently standard in the reproduction of color originals are essentially based on the principle of color density measurement with a direct separation of the color values (R, G, B) acquired in the color image scanner into the color separation values (C, M, Y, K).

The separation occurs according to the techniques of traditional photographic color separation production on the basis of color masking. These separations are specially matched to the type of color image scanner apparatus employed with the spectral sensitivity and signal pre-distortion thereof.

The corrections of the color value signals (R, G, B) necessary for the printing process are experimentally identified in practice by visual comparison between color original and the printing result. An adaptation of the corrections to different printing processes as well as to different color scanning apparatus having different spectral sensitivity is often difficult and time-consuming.

Since the demand is frequently currently raised that different color image scanners be connected to one color image processing system, or that one color image scanner be connected to different color image processing systems, the introduction of a defined standard at the interface between color image scanner and color image processing is of great advantage. For that purpose, the color value signals produced in the color scanner must be calibrated onto the respective, internal standard of the color image processing system.

It is already known from the literature, for example from the periodical "Der Druckspiegel", No. 6, 1991, pages 580–592, "Farbe in der Bildverarbeitung", to transform the color values of an apparatus-dependent input color space acquired in a color image scanner for a universal color presentation into color values of an apparatus-independent communication color space on the basis of color space transformation, to undertake the corresponding corrections with reference to the transformed color values, and to then convert the corrected color values into the corresponding process color values of an apparatus-dependent output color space on the basis of a further color transformation.

The known methods for color space transformation are based on colorimetricelly defined values and can therefore not be employed in color image scanners having undefined color filters, i.e. having color filters that are not matched to the standard spectral value curves of the CIE (Commission Internationale L'Eclairage).

SUMMARY OF THE INVENTION

It is an object of the invention to specify a method and an apparatus for the calibration of color values in the color conversion with which the transformations of apparatus-dependent color spaces into apparatus-independent communication color spaces are improved, so that unambiguous and standardized color values are exchanged at the interface between color image scanning and color image processing.

According to the method and apparatus of the invention for calibration and conversion of color values of a first color space into color values of a second color space for color image processing, functionally corresponding color values $L^*_j(s)$, $a^*_j(s)$, $b^*_j(s)$ of the second color space are approximately calculated independent of the first color space from color values R, G, B of the first color space allocated to an input apparatus taking spectral and electrical properties of the input apparatus into consideration, the functionally corresponding color values being calculated in the form of a conversion table and stored. For acquiring color values R, G, B of the first color space, opto-electronically scanning with the input apparatus a test original containing a plurality of defined test colors, the test original respectively comprising the same material properties as the color original to be scanned with the input apparatus. The color values R, G, B of the first color space acquired by scanning the test colors are converted into the functionally corresponding color values $L^*_j(s)$, $a^*_j(s)$, $b^*_j(s)$ of the second color space with reference to the conversion table. The color values $L^*_j(s)$, $a^*_j(s)$, $b^*_j(s)$ acquired by scanning the test colors and by conversion are compared to color values $L^*_j(m)$, $a^*_j(m)$, $b^*_j(m)$ of the corresponding test colors precisely colorimetrically measured for a given light type. Correction color values $\delta L^*_{rgb}$, $\delta a^*_{rgb}$, $\delta b^*_{rgb}$ for the color values $L^*_j(s)$, $a^*_j(s)$, $b^*_j(s)$ stored in the conversion table are calculated according to a compensation method from color difference values acquired by comparison of the color values $L^*_j(s)$, $a^*_j(s)$, $b^*_j(s)$ and $L^*_j(m)$, $a^*_j(m)$, $b^*_j(m)$ of the test colors.

DESCRIPTION OF THE PREFERRED EMBODIMENTS

Figure 1:
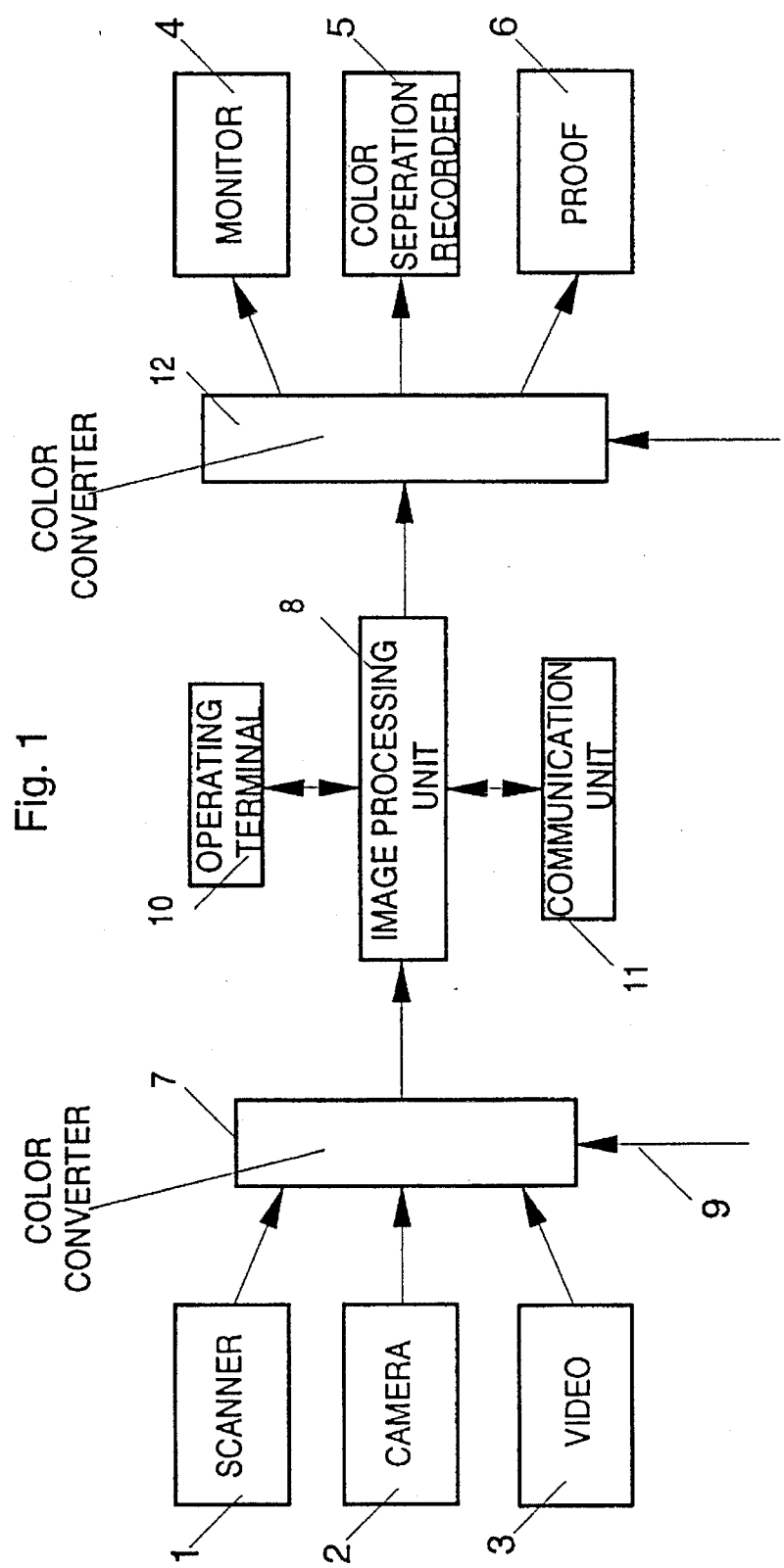
FIG. 1 is a schematic illustration of an image processing system.

FIG. 1 shows the schematic structure and the signal flow of an image processing system. Input apparatus that scan point-by-point and line-by-line are represented by a scanner 1; apparatus that scan planarly are represented by a camera 2; and an apparatus for generating chromatic, graphic data such as, for example, graphic design stations, are represented by a video input 3. The possible output apparatus are indicated by a color monitor 4, by a color separation recorder or exposer 5, as well as by a proof recorder 6. The color values of the respective, apparatus-dependent input color space, for example the color values R, G, and B of the RGB color space generated in the input apparatus 1, 2, 3 are converted into color values of an apparatus-independent communication color space by input color transformation in a three-dimensional input color converter 7, for example into the color values L, a, and b of the CIELAB color space of the CIE of 1976, and are supplied to an image processing unit 8. The input color conversion from the apparatus-dependent input color space into the communication color space occurs via a reference color system.

According to the invention, an input calibration of the color values is undertaken in the input color conversion in an adjustment or calibration phase that precedes the actual operation, whereby an exact matching of the color spaces occurs.

The three dimensional input color converter 7 is designed, for example, as a table store (look-up table) wherein the output color values, for example the color values L, a, and b are stored in addressable fashion by the functionally corresponding input color values, for example the color values R, G, and B. The conversion table is calculated before the actual operation and is loaded into the input color converter 7 via an input 9.

The conversion table can be calculated for all theoretically possible color values of the color space, or, advantageously, can be first calculated only for a flamework of supporting values of roughly graduated color values, whereby all color values actually required for the color transformation are calculated by a three-dimensional interpolation calculation on the basis of the flamework of supporting values. In this case, the input color converter 7 additionally comprises an interpolation unit.

The output color values are specific for a defined input or output apparatus. Given replacement of the apparatus or given modifications at the apparatus, the conversion tables must be recalculated.

As shown in FIG. 1, the three-dimensional input color converter 7 is a separate unit, a component part of an input apparatus 1, 2, 3, or a component part of the image processing unit 8.

The color corrections and geometric processings desired by the user are implemented in the image processing unit on the basis of the transformed color values of the communication color space that is respectively employed. For that purpose, the image processing unit 8 is connected to an operating terminal 10 with which the user implements the desired color corrections. The image processing unit 8 is also in communication with a communication unit 11 in which the color values to be processed are intermediately stored.

After the image processing, the processed color values are read out from the image processing unit 8 and are converted into the process color values of an apparatus-specific output color space on the basis of an output color transformation in an output color converter 12, these process color values being supplied to the respective output apparatus 4, 5, 6. A corresponding output calibration occurs in the output color transformation.

Figure 2:
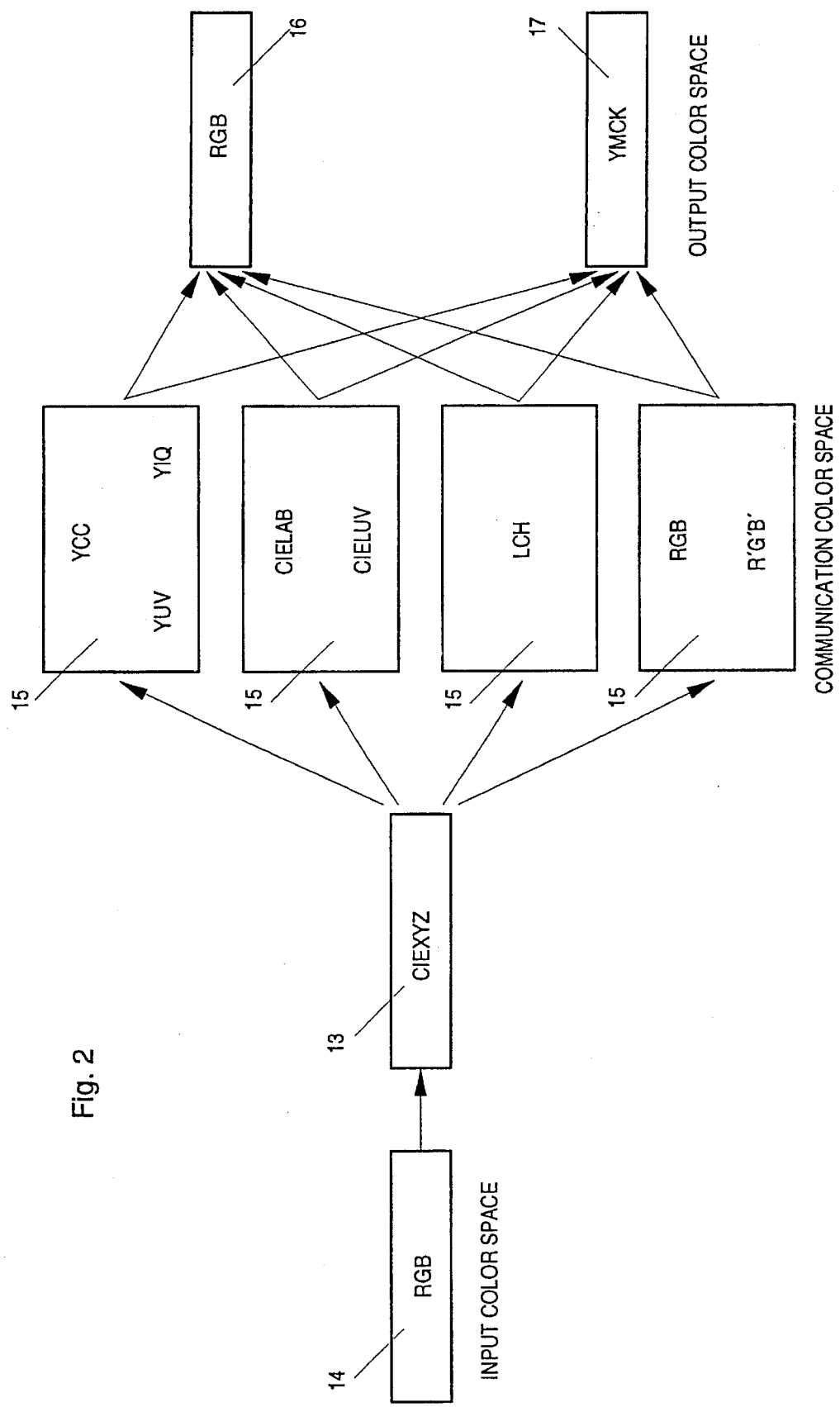
FIG. 2 is a communication model of an image processing system.

FIG. 2 shows a communication model for a color image processing system. The XYZ color value system (CIEXYZ) standardized by the CIE and based on the visual properties of the human eye serves as reference color system 13. In the input calibration, the color values R, G, B of the apparatus-dependent input color space of the input apparatus 1, 2, 3—of the RGB color space 14 in the present case—are first transformed into the reference color system 13. Subsequently, the color values X, Y, Z of the reference color system 13 are converted by mathematically defined transformations into the color values of a selectable, apparatus-independent communication color space 15 wherein the image processing is to occur. For example, the color spaces YCC, YUV, YIQ, CIELAB, CIEUV or LCH that conform to visual sensation or, on the other hand, the abstract RGB color space or a R'G'B' color space, derive therefrom and can be employed as apparatus-independent communication color spaces 15.

After the image processing, the transformation of the processed color values of the communication color space 15 into the process color values of the apparatus-associated output color space occurs, whereby a corresponding output calibration is again implemented. The output color space is an apparatus-dependent RGB color space 16 for the case wherein the output apparatus is a color monitor 4 or a proof recorder 6 driven by RGB color values. When a color separation recorder 5 or a proof recorder 6 driven by CMYK color values is employed as an output apparatus, the output color space is a YMCK color space 19.

Figure 3:
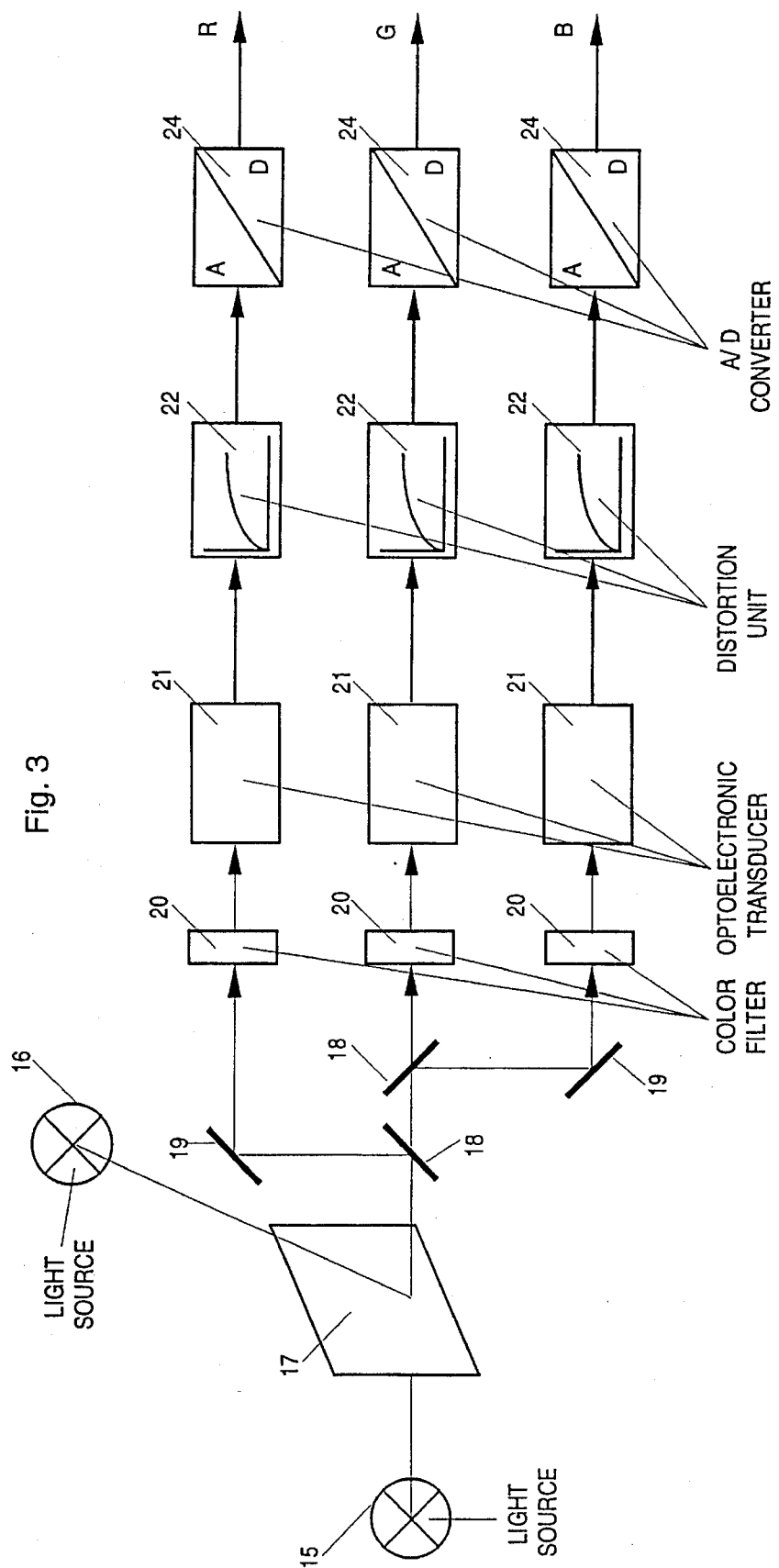
FIG. 3 is a schematic illustration of a color image scanner.

FIG. 3 schematically shows the structure of a color image scanner for point-by-point and line-by-line, trichromatic scanning of opaque or transparency color originals. A light source 15 for the transparency scanning or light source 16 for the opaque scanning illuminates a color original 17 point-by-point and line-by-line on the basis of a relative motion between light source 15 or 16 and color original 17. The scan light modulated with the image content of the scanned color original 17 is resolved into three sub-beams of different spectral compositions on the basis of a beam splitter block that is composed of two dichroitic mirrors 18 and two mirrors 19 and on the basis of color filters 20. The color components "red" (R), "green" (G) and "blue" (B) of the sub-beams are converted into analog measured color value signals and are amplified in optoelectronic transducers 21. The dynamic range of the analog measured color values amounts to approximately 3 to 4 powers of ten. As needed, this dynamic range can be adapted to the signal resolution of, for example, 8 bits that is standard in digital image signal processing. It is adapted thereto on the basis of signal pre-distortion in distortion units 22 adapted to the visual brightness sensation. The analog measured color value signals are converted into digital measured color values R, G, and B in analog-to-digital converters 24, and the measured color value triads of the scanned pixels are intermediately stored for further processing. The digitalization is thereby undertaken such that the digital measured color value zero corresponds to absolute black (transmission or reflection 0.0), and the digital measured color value 255 corresponds to the reference white (transmission or reflection 1.0). However, different allocations are also possible wherein an overflow region is provided in the white. Based on the knowledge of the transfer function of transmission of the color original into digital steps, the transmission values can be recovered from the digital values on the basis of an interpolation method.

Figure 4:
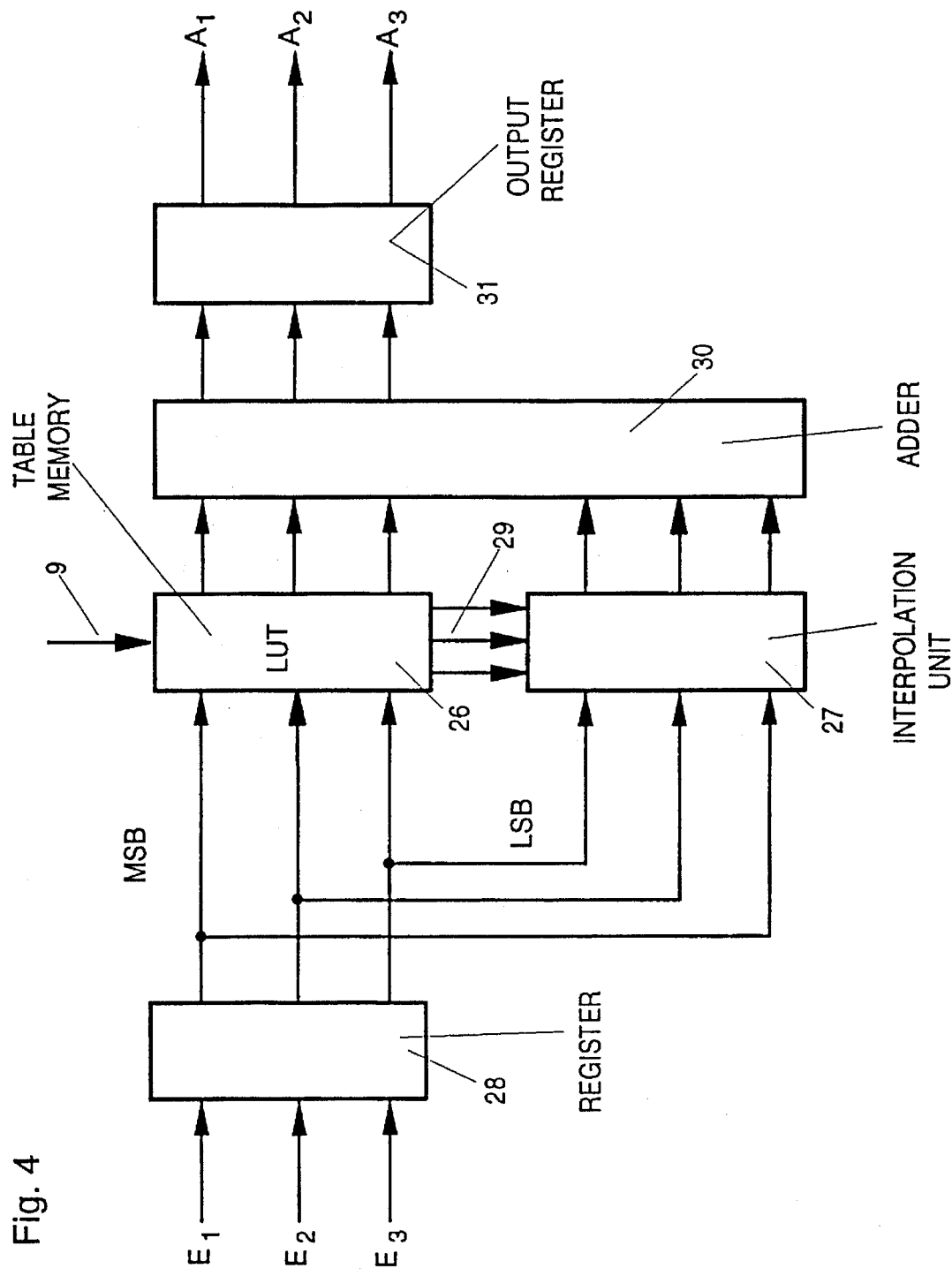
FIG. 4 is a schematic illustration of a color converter.

FIG. 4 shows the fundamental structure of the three-dimensional input color converter 7 comprising a three-dimensional table memory 26, also referred to as a look-up table (LUT), and comprising an interpolation unit 27 for the case wherein the conversion table is initially calculated only for a supporting value framework of roughly graduated color values, and the output color values actually required during the operation are calculated on the basis of a three-dimensional interpolation calculation. The previously calculated, roughly graduated conversion table was deposited in the table memory 26 via the input 9 of the input color converter 7. The input color values $E_1$, $E_2$ and $E_3$ of the input color converter 7, for example the color values R, G and B, are first intermediately stored in a register 28 and am resolved, for example, into five most-significant bits (MSB) and three least-significant bits (LSB) for the further operations, the most-significant bits being supplied to the table memory as addresses and the least-significant bits being supplied to the interpolation unit 27 as operand. In the interpolation unit 27, interpolation values are then calculated from the least-significant bits and the corresponding supporting values which are supplied to the interpolation unit 27 via a line 29. The interpolation values are operated with the supporting values in an adder 30 to form the output color values $A_1$, $A_2$ and $A_3$ of the input color converter 7, for example into the color values L, a, and b, and are deposited in an output register 31.

Figure 5:
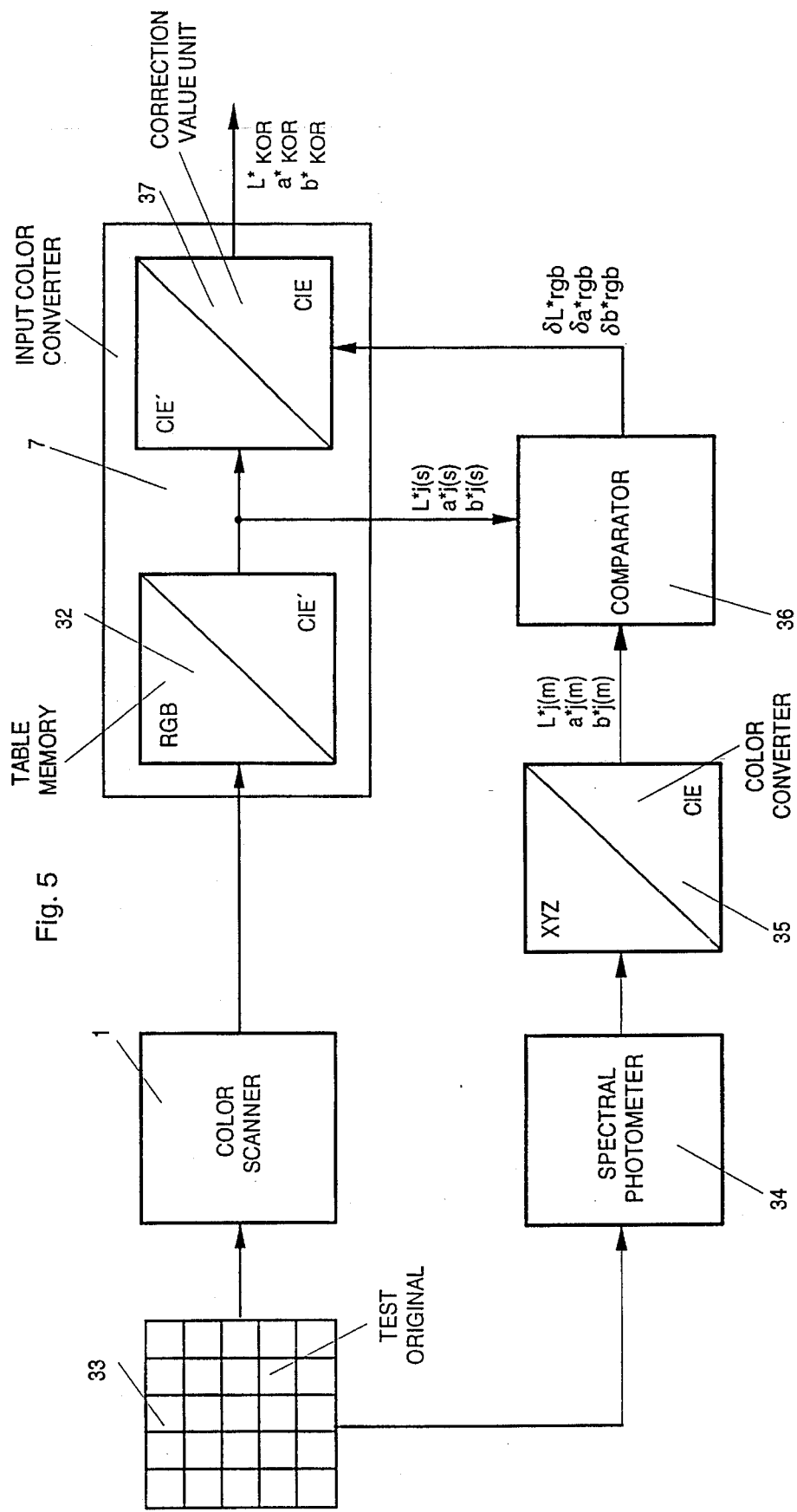
FIG. 5 shows a method sequence in a color calibration in a schematic illustration.

FIG. 5 shows a schematic illustration of the execution of the inventive method for color calibration in the conversion of the color values of an apparatus-dependent input color space into the color values of a communication color space that is independent of the input color space.

In the example set forth below, the color values R, G, and B of the RGB color space of a color image scanner 1 are transformed into the color values L*, a*, and b* of the CIELAB color space, whereby the following method steps (A) through (E) are implemented.

Method Step (A)

In a method step (A), an approximated conversion table for the input color converter 7 is produced and is stored in a table memory 32 of the input color converter 7. The functionally corresponding color values $L*_j(s)$, $a*_j(s)$, and $b*_j(s)$ of the independent CIELAB color space (15) are approximately calculated from color values R, G, and B of the RGB color space 14, taking the spectral and electrical properties of the color image scanner 1 into consideration. The metamerism problems arising due to different color pigments can thereby be simultaneously taken into consideration. The approximate calculation of the color values $L*_j(s)$, $a*_j(s)$ and $b*_j(s)$ of the conversion table is implemented in the following steps.

In a first step ($A_1$), the potentially pre-distorted color values R, G, and B of the color image scanner (1) are linearized according to equation [1].

$$(R, G, B) = f^{-1} (R, G, B) \quad [1]$$

In a second step ($A_2$), the color values R, G, and B are matricized according to equation [2] into the corresponding standard color values X, Y, and Z with the assistance of matrix coefficients (M):

$$(X, Y, Z) = M (R, G, B) \quad [2]$$

In a third step ($A_3$), the standard color values X, Y, and Z are standardized according to equation [3], taking the type of illumination light (reference white) into consideration.

$$(X, Y, Z) = A (X, Y, Z) \quad [3]$$

In a fourth step ($A_4$), the standard color values X, Y, and Z are then transformed into the color values L*, a*, and b* of the communication color space 15 according to equation [4].

$$(L*, a*, b*) = f (X, Y, Z) \quad [4]$$

In a fifth step ($A_5$), finally the color values L*, a*, and b*, are quantized according to equation [5], $$(Lq, aq, bq) = f (L*, a*, b*) \quad [5],$$

and the quantized color values (L*, a*, b*) are stored in the table memory 26 of the input color converter 7.

Due to the selection of the five most-significant bits for addressing the table memory 26, a graduation of the conversion table of eight derives for all three input color values R, G, and B. Output color values Lq, aq, and bq must thus be calculated for all combinations {R, G, B}={0, 8, 16, 248 }.

The calculation of the approximation solution according to steps ($A_1$) through ($A_5$) is based on the following relationships.

The measurement of the color values in a color original in a color image scanner generally occurs according to the three-region method. The spectral value functions of the scanner unit must correspond to those of a standard observer of the CIE from 1931 or a suitable linear combination thereof. The spectral value functions (r, g, b) derive from equations [6] as follows:

$$r(\lambda) = c_r \times S(\lambda) \times \tau_r(\lambda) \times R(\lambda)$$

$$g(\lambda) = c_g \times S(\lambda) \times \tau_g(\lambda) \times R(\lambda)$$

$$b(\lambda) = c_b \times S(\lambda) \times \tau_b(\lambda) \times R(\lambda) \quad [6]$$

$r(\lambda)$, $g(\lambda)$, $b(\lambda)$=spectral value functions of the color image scanner $c_r$, $c_g$, $c_b$=apparatus constant (amplification factors) $\tau_r$, $\tau_g$, $\tau_b$=spectral transmission curves of the color filters $S(\lambda)$, $R(\lambda)$=spectral value functions of light source and light receiver.

Upon employment of equations [6], the color values R, G, and B derive by integration of the color stimulus function of the color original after convolution with the spectral value curves according to equations [7] as:

$$R = \int_{380\,nm}^{780\,nm} \Phi(\lambda) \times r(\lambda) \times d\lambda \quad [7]$$

$$G = \int_{380\,nm}^{780\,nm} \Phi(\lambda) \times g(\lambda) \times d\lambda$$

-continued $$B = \int_{380\,nm}^{780\,nm} \Phi(\lambda) \times b(\lambda) \times d\lambda$$

with $\Phi(\lambda)$=color stimulus function of the color original.

The color values R, G, and B are then usually adapted to the visual sensation of the human eye on the basis of a pre-distortion before they are digitized and transmitted. This pre-distortion must then be cancelled in the calculation of the approximation solution according to step $(A_1)$ before the transformation of the color values R, G, and B into the standard color values X, Y, and Z.

The transformations of the color values R, G, and B into the standard color values X, Y, and Z of the standard color space CIE XYZ of 1931 according to step $(A_2)$ for calculation of the approximation solution is implemented with the assistance of matrixing coefficients M according to equations [8].

$$X\ M_{11}M_{12}M_{13}\ R$$
$$Y=M_{21}M_{22}M_{23}\times G$$
$$Z=M_{31}M_{32}M_{33}\ B \quad\quad [8]$$

Given knowledge of the spectral functions of the scanner unit, the identification of the matrixing coefficients M can occur on the basis of an adaptative calculation. When the spectral functions are not known, the matrixing coefficients M must be experimentally identified by measuring colorimetrically defined color fields of a color table.

In the present example, the identification of the matrixing coefficients M occurs by adaptation of the spectral value functions, whereby the adaptation occurs such that the sum of the error squares becomes minimum over a large plurality of spectral supporting points. The identification of the matrixing coefficients M occurs according to equations as follows:

$$\Sigma_i(M_{11}\times r_i+M_{12}\times g_i+M_{13}\times b_i-x_i)^2=Min$$
$$\Sigma_i(M_{21}\times r_i+M_{22}\times g_i+M_{23}\times b_i-y_i)^2=Min$$
$$\Sigma_i(M_{31}\times r_i+M_{32}\times g_i+M_{33}\times b_i-z_i)^2=Min \quad\quad [9]$$

with $r_i, g_i, b_i$=supporting values of the spectral value function of the color image scanner $x_i, y_i, z_i$=supporting values of the standard spectral value functions of the CIE of 1931 XYZ and i=spectral supporting point in the range from 380 nm through 780 nm with 10 nm intervals.

The calculation of the matrixing coefficients M is numerically simple and is implemented by variation of the coefficients, whereby standardizing is subsequently carried out such that standard color values X, Y, Z=1.0 are achieved for R, G, B=1.0. As a result of this matching of the color values on the same signal level given a reference white, standard color values are calculated that are referred to the light type E of the isoenergetic spectrum. When one of the light types standard in reproduction technology is desired as white reference, then this must be implemented by the "von Kries" transformation for change of chromatic adaptation known from the literature. This occurs by a renewed matrixing of the XYZ color values. This matrix can be calculated with the matrix recited in equations [8].

The transformation of the standard color values X, Y and Z of the standard color space CIEXYZ into the color values L*, a* and b* of the CIELAB color space according to step $(A_4)$ for calculating the approximation solution is implemented according to equations [10] in the following way:

$$L^*=116\times f(Y/Yn)-16$$
$$a^*=500\times [f(X/Xn)-f(Y/Yn)]$$
$$b^*=200\times [f(Y/Yn)-f(Z/Zn)] \quad\quad [10]$$

with

| | | |
|---|---|---|
| $f(X/Xn)$ | $=(X/Xn)^{1/3}$ | for $X/Xn > 0.008856$ |
| | $=7.787\times (S/Sn)+16/116$ | for $X/Xn < 0.008856$ |
| $f(Y/Yn)$ | $=(Y/Yn)^{1/3}$ | for $Y/Yn > 0.008856$ |
| | $=7.787\times (Y/Yn)+16/116$ | for $Y/Yn < 0.008856$ |
| $f(Z/Zn)$ | $=(Z/Zn)^{1/3}$ | for $Z/Zn > 0.008856$ |
| | $=7.787\times (Z/Zn)+16/116$ | for $Z/Zn < 0.008856$ | and Xn, Yn, Zn as white reference of the desired white type.

The above-explained calculations are equivalently implemented for other color spaces.

The color values L*, a*, and b* calculated according to equation [10] must be imaged onto the existing digital stages or the internal representation. The value range of the brightness L* lies between 0 and 100; the value range of the variegations a* and b* of body colors based on experience lie between −100 and +100. Given an internal resolution of 8 bits or 256 digital stages, the said value ranges are to be imaged thereon.

The luminance L* can be imaged onto the full scope of the digital stages with the assistance of a scaling factor. A shift of the zero point in order to work only with positive values is necessary in the variegations a* and b* dependent on the implementation of the interpolation steps of the color converter. A possible quantization can occur according to equation [11].

$$L_q=[L_f\times L^*]$$
$$a_q=[a_f\times a^*]+a_n$$
$$b_q=[b_f\times b^*]+b_n \quad\quad [11]$$

with $L_q$, $a_q$, $b_q$=quantized CIELAB color values $L_f$, $a_f$, $b_f$=quantization factors $a_n$, $b_n$=zero point offset

[. . .]=rounding function to the next whole number and $L_f$=255/100, $a_f$, $b_f$=100/128, $a_n$, $b_n$=128.

Method Step (B)

In a method step (B), a suitable test original 33 that contains a plurality j of defined test colors is opto-electronically scanned with the color image scanner 1, whereby the test original 33 respectively comprises the same material properties as the color original 17 to be scanned later with the color image scanner 1, and the color values R, G, and B of the RGB color space 14 acquired therewith are converted into the functionally allocated color values $L^*_j(s)$, $a^*_j(s)$ and $b^*_j(s)$ of the communication color space 15 on the basis of the conversion table calculated in method step (A), and are deposited in the table memory 32 of the input color converter 7.

For example, a color table having a plurality j of color fields such as, for example, the color tables of the Kodak Company (Q60-A, -B, -C) can be employed as test original 33. The plurality of color fields and their frequency distribution must be suitably selected for the calibration method. The color fields should cover the color space of the color original visually uniformly distributed, preferably over-proportionally covering the region of less variegated colors since less variegated colors occur more frequently than highly variegated colors. The color fields have their scope of luminance matched to the scope contained in the approximation solution. This is expediently undertaken at the brightest color field of the test original. The matching factor can be stored for a calculation of absolute original color values.

Method Step (C)

In a method step (C), the test colors of the test original 33 are measured with a spectral photometer 34 as standard color values X, Y, and Z for a prescribed light type and the standard color values X, Y, and Z are converted into the colorimetrically exact color values $L^*_j(m)$, $a^*_j(m)$, and $b^*_j(m)$ of the communication color space 15 in a color converter 35.

Instead of a spectral photometer, a colorimeter or a correspondingly calibrated input apparatus, particularly a color scanner 1, can also be employed.

Method Step (D)

In a method step (D), the color values $L^*_j(s)$, $a^*_j(s)$, and $b^*_j(s)$ of the test color calculated in method step (A) are compared to the color values $L^*_j(m)$, $a^*_j(m)$, and $b^*_j(m)$ of the corresponding test colors calculated in method step (C) in a comparator 36, and color difference values $L^*_j(m)-L^*_j(s)$, $a^*_j(m)-a^*_j(s)$, and $b^*_j(m)-b^*_j(s)$ are calculated from the comparison.

Method Step (E)

In a method step (E), correction color values $\delta L^*_{rgb}$, $\delta a^*_{rgb}$, and $\delta b^*_{rgb}$ in the form of a correction value table are then calculated from the color difference values $L^*_j(m)-L^*_j(s)$, $a^*_j(m)-a^*_j(s)$, and $b^*_j(m)-b^*_j(s)$, and the corrected color values $L^*_{KOR}$, $a^*_{KOR}$, and $b^*_{KOR}$ are calculated in a correction value unit 37 on the basis of a weighted addition of correction color values $\delta L^*_{rgb}$, $\delta a^*_{rgb}$, and $\delta b^*_{rgb}$, and color values $L^*_j(s)$, $a^*_j(s)$, and $b^*_j(s)$ of the approximated conversion table according to equation [12].

$$L^*_{KOR} = L^*_{rgb} + \delta L^*_{rgb}$$

$$a^*_{KOR} = a^*_{rgb} + \delta a^*_{rgb}$$

$$b^*_{KOR} = b^*_{rgb} + \delta b^*_{rgb} \quad [12]$$

Two courses can be embarked upon for calculating the corrected color values $L^*_{KOR}$, $a^*_{KOR}$, and $b^*_{KOR}$. First, the correction color values $\delta L^*_{rgb}$, $\delta a^*_{rgb}$, and $\delta b^*_{rgb}$ can be stored and, during the actual original scanning following the calibration phase, can be continuously added to the color values $L^*_j(s)$, $a^*_j(s)$, and $b^*_j(s)$ of the conversion table in the correction value unit 37. Second, the addition of the correction color values $\delta L^*_{rgb}$, $\delta a^*_{rgb}$, and $\delta b^*_{rgb}$ and of the color values $L^*_j(s)$, $a^*_j(s)$, and $b^*_j(s)$ can occur in the calibration phase. The corrected color values $L^*_{KOR}$, $a^*_{KOR}$, and $b^*_{KOR}$ are then stored in the correction value unit 37 and are read out from the correction value unit 37 during the original scanning and are further processed.

Expediently, the color values $L^*_j(s)$, $a^*_j(s)$ and $b^*_j(s)$ of the approximate conversion table and the corresponding correction color values $\delta L^*_{rgb}$, $\delta a^*_{rgb}$, and $\delta b^*_{rgb}$ are calculated only for a supporting value flamework of the theoretically possible color space, and the corrected color values $L^*_{KOR}$, $a^*_{KOR}$, and $b^*_{KOR}$ actually required in the color conversion executed later are calculated by interpolation in the supporting flamework.

Given a supporting value flamework having, for example, 32×32×32=32768 supporting points for the color values, it is expedient to implement the input color calibration according to a compensation method having a smaller plurality of color values.

The calculation of the correction color values $\delta L^*_{rgb}$, $\delta a^*_{rgb}$, and $\delta b^*_{rgb}$ according to the compensation method advantageously occurs on the basis of a colorimetric interval weighting with a weighting or interval function $f(rgb, i)$ according to equation [13].

$$\delta L^*_{rgb} = \Sigma_i [f(rgb,i) \times (L^*_i(m) - L^*_i(s))] / \Sigma_i [f(rgb,i)]$$

$$\delta a^*_{rgb} = \Sigma_i [f(rgb,i) \times (a^*_i(m) - a^*_i(s))] / \Sigma_i [f(rgb,i)]$$

$$\delta b^*_{rgb} = \Sigma_i [f(rgb,i) \times (b^*_i(m) - b^*_i(s))] / \Sigma_i [f(rgb,i)] \quad [13]$$

whereby $\delta L^*_{rgb}$, $\delta a^*_{rgb}$, $\delta b^*_{rgb}$ = correction color values $L^*_j(s)$, $a^*_j(s)$, $b^*_j(s)$ = exact color values of a test color i $L^*_j(m)$, $a^*_j(m)$, $b^*_j(m)$ = approximated color values of a test color i and $f(rgb, i)$ = interval function.

The summation i thereby proceeds over all color fields of the test original 33.

The interval function $f(rgb,i)$ is expediently an inverse function of the fourth order according to equation [14].

$$f(rgb,i) = 1/[(L^*rgb - L^*_i(m))^2 + (a^*rgb - a^*_i(m))^2 + (b^*rgb - b^*_i(m))^2] \quad [14]$$

The interval function $f(rgb,i)$ takes color fields of the test original 33 in the proximity of the current supporting point into greater consideration than more remote color fields. The selection of the interval function defines the quality and convergence of the method. Average value and standard deviation as characteristics of the quality of the color conversion can be calculated with known methods.

The color calibration is thus ended and the actual scanning of the color original to be reproduced can begin. When it thereby turns out that the errors and the standard deviation are too great in a specific application, the color calibration can be repeated with a new, approximated conversion table until the desired deviation is achieved or fallen below.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for calibrated conversion of color values of a first color space obtained by scanning a color original into color values of a second color space in apparatus for conducting color corrections of the color original in the second color space, comprising the steps of:

for acquiring color values R, G, B of the first color space, opto-electronically scanning with an input apparatus a test original containing a plurality of defined test colors, the test original respectively comprising same material properties as the color original to be later scanned with the input apparatus after calibration with the test original has been completed;

approximately calculating functionally corresponding color values $L^*_j(s)$, $a^*_j(s)$, $b^*_j(s)$ of the second color space independent of the first color space from color values R, G, B of the first color space taking spectral and electrical properties of the input apparatus into consideration, the approximate functionally corresponding color values being calculated in the form of a conversion table and stored;

colorimetrically measuring for a given light type said test colors of said test original to create standard test color values X, Y, Z of the first color space and converting the standard color values X, Y, Z into colorimetrically exact color values $L^*_j(m)$, $a^*_j(m)$, $b^*_j(m)$ of the second color space;

comparing said color values $L^*_j(s)$, $a^*_j(s)$, $b^*_j(s)$ to said color values $L^*_j(m)$, $a^*_j(m)$, $b^*_j(m)$;

calculating correction color values $\delta L^*_{rgb}$, $\delta a^*_{rgb}$, $\delta b^*_{rgb}$ for the stored color values $L^*_j(s)$, $a^*_j(s)$, $b^*_j(s)$ from color difference values acquired by comparison of the color values $L^*_j(s)$, $a^*_j(s)$, $b^*_j(s)$ and $L^*_j(m)$, $a^*_j(m)$, $b^*_j(m)$ so as to complete calibration; and scanning said color original with said input apparatus to create color values in the first color space, utilizing said correction color values $\delta L^*_{rgb}$, $\delta a^*_{rgb}$, $\delta b^*_{rgb}$ during a conversion of the color original color values in the first color space to color original color values in the second color space in the form of corrected values $L^*_{KOR}$, $a^*_{KOR}$, $b^*_{KOR}$, then making said color corrections in the second color space using said corrected values $L^*_{KOR}$, $a^*_{KOR}$, $b^*_{KOR}$, and then converting resulting color values into an output device color space and displaying a corrected color image.

2. A method according to claim 1 including the step of providing the test original as a color table having colorimetrically defined color fields.

3. A method according to claim 1 including the step of selecting the test colors of color fields visually equally spaced in the first color space.

4. A method according to claim 1 including the step of measuring the color values of the test colors with a spectral photometer.

5. A method according to claim 1 including the step of measuring the color values of the test colors with a colorimeter.

6. A method according to claim 1 including the step of measuring the color values of the test colors with a correspondingly calibrated input apparatus.

7. A method according to claim 1 wherein said input apparatus comprises a color scanner.

8. A method according to claim 1 including the step of pre-distorting the color values R, G, B acquired with the input apparatus before their color conversion.

9. A method according to claim 1 including the step of storing and adding the correction color values $\delta L^*_{rgb}$, $\delta a^*_{rgb}$, $\delta b^*_{rgb}$ with proper operational sign to the stored color values $L^*_j(s)$, $a^*_j(s)$, $b^*_j(s)$ of the conversion table during ongoing color conversion after color calibration in order to obtain said corrected color values $L^*_{KOR}$, $a^*_{KOR}$, $b^*_{KOR}$.

10. A method according to claim 1 including the step of adding the correction color values $\delta L^*_{rgb}$, $\delta a^*_{rgb}$, $\delta b^*_{rgb}$ with proper operational sign to the stored color values $L^*_j(s)$, $a^*_j(s)$, $b^*_j(s)$ of the conversion table before ongoing color conversion in order to obtain said corrected color values $L^*_{KOR}$, $a^*_{KOR}$, $b^*_{KOR}$ of a corrected conversion table for the ongoing color conversion.

11. A method according to claim 1 including the step of storing the color values of the conversion table as a three-dimensional look-up table.

12. A method according to claim 1 including the step of providing the input apparatus as a color camera for trichromatic scanning of color originals.

13. A method according to claim 1 including the step of providing the input apparatus as a color image scanner for trichromatic scanning of color originals.

14. A method according to claim 1 including the step of calculating the color values $L^*_j(s)$, $a^*_j(s)$, $b^*_j(s)$ of an approximate conversion table and calculating the corresponding correction color values $\delta L^*_{rgb}$, $\delta a^*_{rgb}$, $\delta b^*_{rgb}$ only for a supporting framework of a theoretically possible color space and calculating said corrected color values $L^*_{KOR}$, $a^*_{KOR}$, $b^*_{KOR}$ actually required in the later, ongoing color conversion by interpolation in the supporting framework.

15. A method according to claim 1 including the steps of implementing the approximate calculation of the color values $L^*_j(s)$, $a^*_j(s)$, $b^*_j(s)$ of the conversion table in the following steps:

linearizing potentially pre-distorted color values R, G, B of the first color space, matrixing the color values R, G, B into corresponding standard color values X, Y, Z with assistance of matrix coefficients, norming the standard color values X, Y, Z taking the illuminating light type into consideration, and transforming the normed standard color values X, Y, Z into color values L, a, b of the second color space.

16. A method according to claim 15 including the step of calculating by a matching calculation matrix coefficients M, given knowledge of the spectral function of the input apparatus, the matching occurring such that a sum of error squares is minimum over a large number of spectral supporting points.

17. A method according to claim 15 including the step of calculating the matrix coefficients M by measuring colorimetrically defined test colors.

18. A method according to claim 1 including the step of selecting an equally spaced color space which conforms to sensation as said second color space.

19. A method according to claim 18 wherein said equally spaced color space is a CIELAB color space.

20. A method according to claim 1 including the step of calculating the correction color values $\delta L^*_{rgb}$, $\delta a^*_{rgb}$, $\delta b^*_{rgb}$ from the approximately calculated color values $L^*_j(s)$, $a^*_j(s)$, $b^*_j(s)$ and the color values $L^*_j(m)$, $a^*_j(m)$, $b^*_j(m)$ of the test colors with colorimetric interval weighting on the basis of an interval function $f(rgb,i)$.

21. A method according to claim 1 including the steps of calculating the correction color values $\delta L^*_{rgb}$, $\delta a^*_{rgb}$, $\delta b^*_{rgb}$ from the approximately calculated color values $L^*_j(s)$, $a^*_j(s)$, $b^*_j(s)$ and the color values $L^*_j(m)$, $a^*_j(m)$, $b^*_j(m)$ of the test color with colorimetric interval weighting on the basis of an interval function $f(rgb,i)$, the correction color values being calculated according to the following equation:

$$\delta L^*_{rgb} = \Sigma_i [f(rgb,i) \times (L^*_i(m) - L^*_i(s))] / \Sigma_i [f(rgb,i)]$$

$$\delta a^*_{rgb} = \Sigma_i [f(rgb,i) \times (a^*_i(m) - a^*_i(s))] / \Sigma_i [f(rgb,i)]$$

$$\delta b^*_{rgb} = \Sigma_i [f(rgb,i) \times (b^*_i(m) - b^*_i(s))] / \Sigma_i [f(rgb,i)] \quad [13]$$

and the corrected color values $L^*_{KOR}$, $a^*_{KOR}$, $b^*_{KOR}$ being calculated by addition from the color values $L^*_{rgb}$, $a^*_{rgb}$, $b^*_{rgb}$ and the correction color values $\delta L^*_{rgb}$, $\delta a^*_{rgb}$, $\delta b^*_{rgb}$, according to the following equation:

$$L^*_{KOR}=L^*_{rgb}+\delta L^*_{rgb}$$

$$a^*_{rgb}=a^*_{rgb}+\delta a^*_{rgb}$$

$$b^*_{rgb}=b^*_{rgb}+\delta b^*_{rgb}$$

whereby $L^*_{rgb}$, $a^*_{rgb}$, $b^*_{rgb}$=transformed R, G, B color values $\delta L^*_{rgb}$, $\delta a^*_{rgb}$, $\delta b^*_{rgb}$=correction color values $L^*_j(s)$, $a^*_j(s)$, $b^*_j(s)$=exact color values of a test color i $L^*_j(m)$, $a^*_j(m)$, $b^*_j(m)$=approximated color values of a test color i f(rgb,i)=interval function.

22. A method according to claim 21 including the step of selecting a function of the fourth order having the form $f(rgb,i)=1/[L^*_{rgb}-L^*_i(m))^2+ (a^*_{rgb}-a^*_i(m)^2+b^*_{rgb}-b^*_i(m))^2]^2$ as said interval function.

23. A method according to claim 1 including the steps of providing a plurality of supporting points in the conversion table smaller than a plurality of supporting points of a corrected conversion table, and calculating the correction color values $\delta L^*_{rgb}$, $\delta a^*_{rgb}$, $\delta b^*_{rgb}$ by interpolation.

24. An apparatus for calibrated conversion of color values of a first color space obtained by scanning a color original into color values of a second color space and for conducting a color correction in the second color space, comprising:

an input apparatus for acquiring color values R, G, B of the first color space by opto-electronically scanning a test original containing a plurality of defined test colors, the test colors, the test original respectively comprising same material properties as the color original to be later scanned with the input apparatus after calibration with the test original has been completed;

means for approximately calculating functionally corresponding color values $L^*_j(s)$, $a^*_j(s)$, $b^*_j(s)$ of the second color space independent of the first color space from color values R, G, B of the first color space allocated to an input apparatus taking spectral and electrical properties of the input apparatus into consideration, the approximate functionally corresponding color values being calculated in the form of a conversion table and stored;

means for colorimetrically measuring for a given light type said test colors of said test original to create standard test color values X, Y, Z in the first color space and converting the standard color values X, Y, Z into colorimetrically exact color values $L^*_j(m)$, $a^*_j(m)$, $b^*_j(m)$ of the second color space;

means for comparing said color values $L^*_j(s)$, $a^*_j(s)$, $b^*_j(s)$ to said color values $L^*_j(m)$, $a^*_j(m)$, $b^*_j(m)$;

means for calculating correction color values $\delta L^*_{rgb}$, $\delta a^*_{rgb}$, $\delta b^*_{rgb}$ for the stored color values $L^*_j(s)$, $a^*_j(s)$, $b^*_j(s)$ from color difference values acquired by comparison of the color values $L^*_j(s)$, $a^*_j(s)$, $b^*_j(s)$ and $L^*_j(m)$, $a^*_j(m)$, $b^*_j(m)$ so as to complete calibration;

said input apparatus also scanning said color original to create color values in the first color space, means for utilizing said correction color values $\delta L^*_{rgb}$, $\delta a^*_{rgb}$, $\delta b^*_{rgb}$ during a conversion of the color original color values in the first color space to color original color values in the second color space in the form of corrected values $L^*_{KOR}$, $a^*_{KOR}$, $b^*_{KOR}$, and means for making said color corrections of the color original in the second color space using said corrected values $L^*_{KOR}$, $a^*_{KOR}$, $b^*_{KOR}$; and means for converting color values resulting from the color corrections into an output device color space and displaying a corrected color image.

25. A method for calibrated conversion of color values of a device dependent color space obtained by scanning a color original into color values of a device independent color space so that color corrections on the original image can be conducted in the device independent color space, comprising the steps of:

providing a test original and scanning said test original before scanning the color original in order to perform a calibration;

converting color values obtained by scanning the test original in the device dependent color space into approximate color values in the device independent color space;

precisely colorimetrically measuring test colors in the test original to obtain standard color values in the device dependent color space and then converting the standard color values into the device independent color space with a color converter to provide colorimetrically precise color values;

comparing the colorimetrically precise color values in the device independent color space to said approximate color values in the device independent color space so as to create correction values for calibration;

scanning the color original to create color values in the device dependent color space, converting those values into corrected calibrated color values in the device independent color space by use of said correction values, conducting color corrections on the color original in the second color space utilizing said corrected calibrated color values, converting color values after the color correction has been performed into an output device color space, and then displaying the corrected color original.

* * * * *